United States Patent [19]

Ford

[11] 3,724,878
[45] Apr. 3, 1973

[54] FLEXIBLE CONNECTOR

[76] Inventor: John A. Ford, 543 Landfair Avenue, Los Angeles, Calif. 90024

[22] Filed: Mar. 24, 1971

[21] Appl. No.: 127,601

[52] U.S. Cl. .....................285/93, 285/94, 285/163, 285/233, 285/367
[51] Int. Cl. ...............................................F16l 21/06
[58] Field of Search........285/233, 234, 231, 367, 94, 285/261, 54, 350, 337, 232, 163, 164, 165, 93, 94

[56] References Cited

UNITED STATES PATENTS

| | | | |
|---|---|---|---|
| 3,498,649 | 3/1970 | Pfeuffer | 285/93 X |
| 1,983,228 | 12/1934 | Hall | 285/54 |
| 3,432,189 | 3/1969 | Buller | 285/232 |
| 3,499,667 | 3/1970 | Pfueffer | 285/233 X |
| 3,544,137 | 12/1970 | Contreras et al. | 285/261 |
| 1,848,198 | 3/1932 | Reid | 285/231 |
| 3,206,229 | 9/1965 | Kramer | 285/231 X |
| 2,656,857 | 10/1953 | Cavallier | 285/94 X |

FOREIGN PATENTS OR APPLICATIONS

| | | | |
|---|---|---|---|
| 1,229,584 | 3/1960 | France | 285/231 |
| 550,596 | 11/1956 | Italy | 285/231 |
| 334,284 | 9/1930 | Great Britain | 285/232 |
| 541,300 | 3/1956 | Italy | 285/231 |
| 1,231,977 | 1/1967 | Germany | 285/367 |

Primary Examiner—Thomas F. Callaghan
Attorney—George W. Finch

[57] ABSTRACT

A connector for joining two hollow members intended for the transport of fluid and/or gas medium where axial, rotational and/or angular relative movement may be present between the hollow members. The connector includes a bell-housing member adapted for rigid attachment to one of the hollow members. The bell-housing member forms the desired flexible connection to the other hollow member by means of a gasket which is retained and pressed thereagainst by a gasket hood formed by the flared end of the bell-housing member, a retaining ring, and a clamping ring which surrounds the hood. The gasket is specially shaped to have desirable deformation and sealing characteristics.

7 Claims, 6 Drawing Figures

INVENTOR.
JOHN A. FORD
BY
George A Finch
- Attorney -

PATENTED APR 3 1973 3,724,878

INVENTOR.
JOHN A. FORD
BY
George W. Finch
-ATTORNEY- 3,724,878

FLEXIBLE CONNECTOR

BACKGROUND OF THE INVENTION

Many fluid and/or gas couplings which allow relative motion between the mated lines are well known in the art. Some of these include gasketed ball joints, such as those shown in Contreras et al., U. S. Pat. No. 3,544,137, which perform adequate jobs in allowing angular and rotational displacement of the mated lines but which include no means to allow axial displacement thereof. Heretofore the only types of couplings which have allowed both angular and axial motion are those which include bellows or hose which by their very nature are expensive and frangible, have limited motion capability including no capability for rotational movement and must be relatively large and bulky. Slip joints, on the other hand, permit axial contractions and extensions only and therefore their use is greatly limited.

SUMMARY OF THE INVENTION

The present invention provides a flexible connector for fluid and/or gas medium lines, which medium may be at elevated temperatures and pressures. The present connector is easily disconnected and it can allow simultaneous axial, rotational and/or angular relative movement between the connected lines. Therefore, it can be used for example, as a separable connector, a motion compensator, an expansion joint, and as an installation misalignment adjuster, whereas none of the prior art joints can be used in more than two of the above enumerated applications. The multi-purpose qualities of the present connector enable it to be used instead of many other joints thereby allowing a substantial reduction in required inventories. A typical application for the present connector is in the exhaust system of an internal combustion engine.

The connector includes a hollow bell-housing member which is adapted at one end to be connected to one of the medium lines. The opposite end of the bell-housing member is outwardly flared to form a portion of a gasket hood. The other portion of the gasket hood is formed by a retaining ring having a mirror image S-shape flare similar to the flare of the bell-housing end. A generally V-shaped clamping ring retains the two portions of the gasket hood over a gasket member positioned under and therebetween. The clamping ring is adjustable so that as the gasket member wears, the ring can still apply sufficient force thereto through the hood to maintain the desired seal. Means are also provided to indicate gasket wear.

The present connector can be used in conjunction with a rigid line of a predetermined diameter or with an optional insert member adapted for connection to the line. In either case, the line or insert member extends within the bell-housing and the gasket is forced against the outer cylindrical surface thereof by the gasket hood and the clamping ring to form a fluid and/or gas tight seal.

The gasket is ring shaped and is usually made from conventional materials in correspondence to the expected use of the connector. The cross-section of the gasket, on the other hand, is an important departure from conventional gaskets such as shown in Contreras et al. having isosceles trapezoid cross-sections. The sides, top and bottom of the present gasket cross-section are curved surfaces of predetermined radii rather than flat surfaces. The radii are specially chosen to improve the deformation and sealing characteristics of the gasket.

It is therefore an object of the present invention to provide a flexible coupling which can allow simultaneous angular, axial and/or rotation movement.

Another object is to provide a gasketed coupling whose gasket wear can be visually inspected while the coupling is in use.

Another object of the present invention is to provide a multi-purpose connector which is an improved substitute for many different types of prior art connectors.

Another object is to provide a gasketed flexible coupling having a minimum of parts and being at the same time relatively economical to manufacture.

Another object is to provide a gasket having a special cross-section shape to provide desirable deformation and sealing characteristics.

Another object is to provide a gasketed flexible coupling whose gasket can be removed and replaced without parting the connected lines.

Another object is to provide a flexible coupling which allows almost no leakage even at elevated temperatures and pressures.

Another object is to provide a joint which has a long life expectancy and is easy to install and repair.

Another object is to provide flexible couplings which can be used in pairs to connect lines having large offset deflections and installation misalignments.

These and other objects and advantages of the present invention will become apparent after considering the following detailed specification which covers a preferred embodiment thereof in conjunction with the accompanying drawings wherein:

BRIEF DESCRIPTION OF THE DRAWINGS

FIG. 3 is a cross-sectional view of the gasket in its unstressed state as employed in the present invention;

DETAILED DESCRIPTION OF THE SHOWN EMBODIMENT

Figure 1:
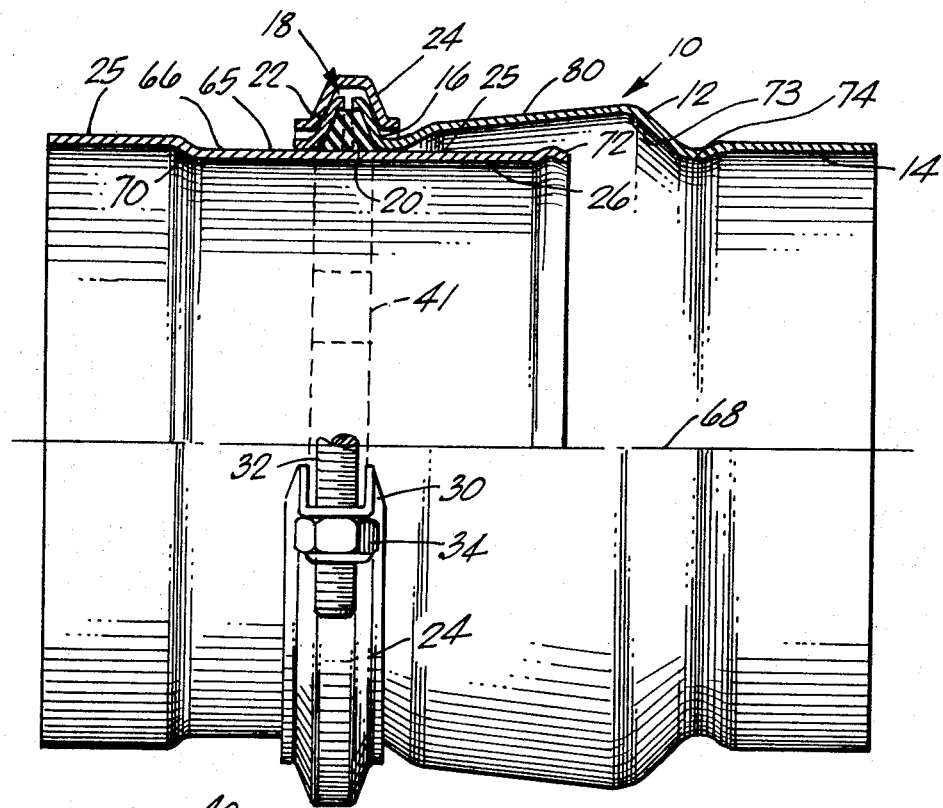
FIG. 1 is a side view, partially in cross-section, of a connector employing the features of the present invention.

Referring to the drawings more particularly by reference numbers, number 10 in FIG. 1 refers to a connector assembly constructed according to the present invention. The assembly 10 includes a hollow bell-housing 12 which is adapted at one end 14 thereof to be clamped, welded or otherwise attached to a fluid or gas carrying line. The opposite end of the bell-housing 12 is expanded into an outwardly flaring portion 16 to form part of a gasket hood 18 for a gasket 20. The gasket hood 18 additionally, is formed in part by a retaining ring 22 having a shape similar but opposite to the flared end portion 16 of the bell-housing 12. Clamping means such as a generally V-shaped clamping ring 24 are used to back-up and retain the gasket hood 18 about the gasket 20 and also to compress the gasket 20 within the hood 18 inwardly either against the outer surface of a line of proper diameter or against the outer circumferential surface 25 of an optional insert tube 26 as shown.

Figure 2:
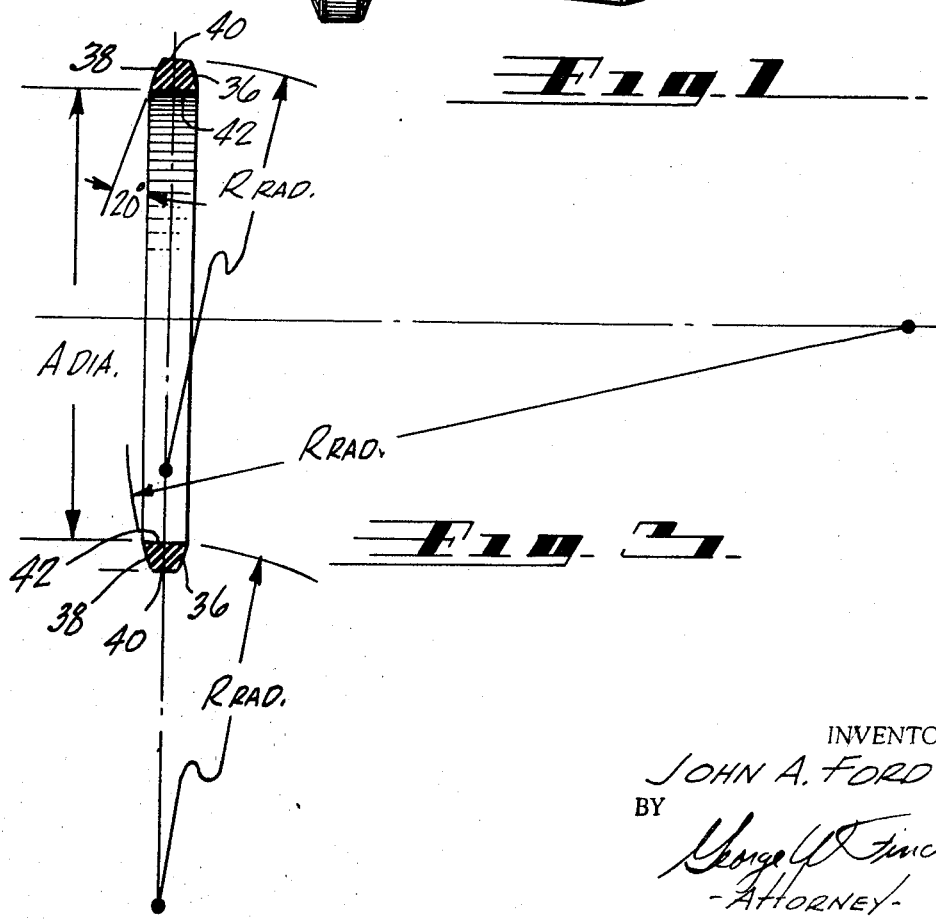
FIG. 2 is an end view, partially in cross-section of the connector of FIG. 1.
Figure 2:
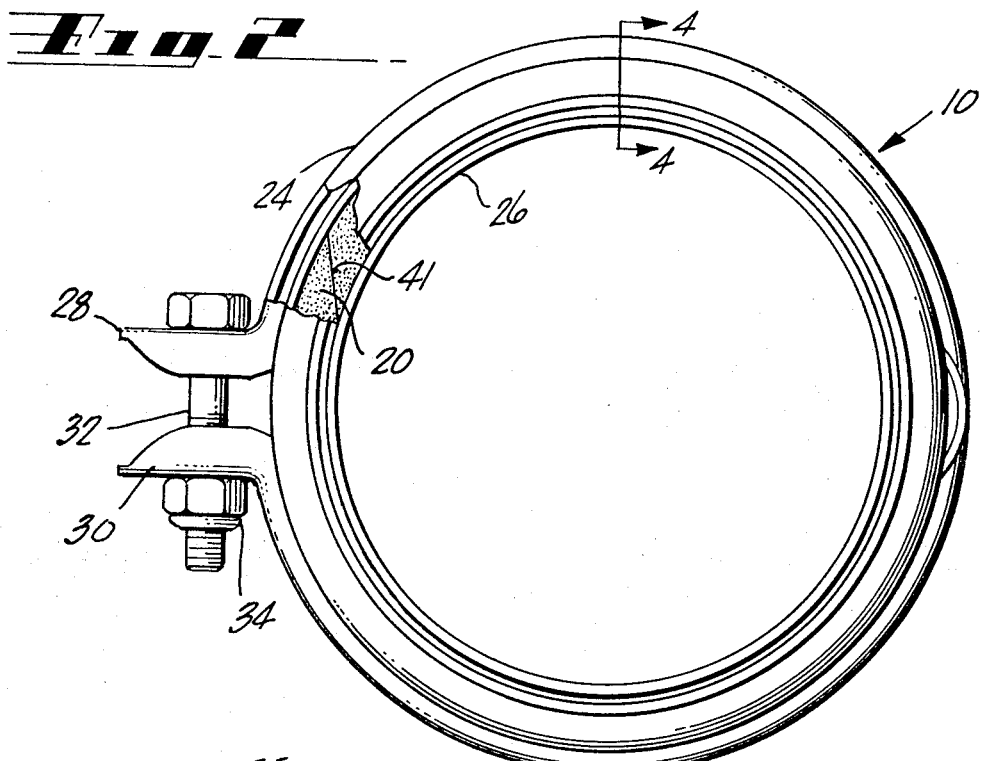

The clamping ring 24 is also used to adjust the compression of the gasket 20 as it wears and therefore, it includes means such as one or more pairs of up-standing bolt posts 28 and 30 (FIG. 2) which include holes therethrough for receiving at least one bolt 32. The bolt 32 and an associated nut 34 draw the posts 28 and 30 together to reduce the diameter of the clamping ring 24 and to compress the gasket 20.

The gasket 20 can be made from conventional type gasket materials such as rubber, graphite impregnated asbestos, nylon and silicone with the choice of materials dependent upon the expected use. The gasket 20 as shown in FIG. 3, is ring shaped, having a cross-section which is generally an isosceles trapezoid with one important difference. The sides 36 and 38 and the outer and inner surfaces 40 and 42 of the gasket 20, rather than being flat, preferably all have a curvature which is provided to improve the deformation and sealing characteristics thereof. The relationships between the radii of these curvatures and gaskets of various diameters are shown in FIG. 3 and the table below as typical examples.

| Tube size | A dia   | R ±.50 Rad |
|-----------|---------|------------|
| 1.00"     | 1.000"  | 1.83"      |
| 1.50"     | 1.500"  | 2.56"      |
| 2.00"     | 2.000"  | 3.29"      |
| 2.50"     | 2.500"  | 4.02"      |
| 3.00"     | 3.000"  | 4.75"      |
| 4.00"     | 4.000"  | 6.21"      |
| 5.00"     | 5.000"  | 7.68"      |
| 6.00"     | 6.000"  | 9.14"      |

It should be noted that the use of the above radii causes the sides 36 and 38 of the gasket 20 to be slanted about 20° from the vertical.

When it is desired to install the present connector assembly 10 between two lines, the bell-housing 12 is firmly connected to one of the lines as aforesaid. The retaining ring 22 is then placed on the other line or the optional insert tube 26 which, like the bell-housing 12, can be firmly connected to the line. The gasket 20 is also placed about the tube 26 and in abutment with the retaining ring 22. The retaining ring 22 assists in maintaining the gasket 20 in proper position about the tube 26 while the flared end portion 16 of the bell-housing 12 is brought into abutment with the opposite side of the gasket 20. The retention action of the ring 22 is important if the gasket 20 is of the split type, having a scarfed cut 41 therethrough because such split gaskets are ordinarily difficult to position during installation. The clamping ring 24 is then installed thereabout to maintain the gasket hood 18 formed by the end 16 and the ring 22 over the gasket 20.

Figures 4, 5:
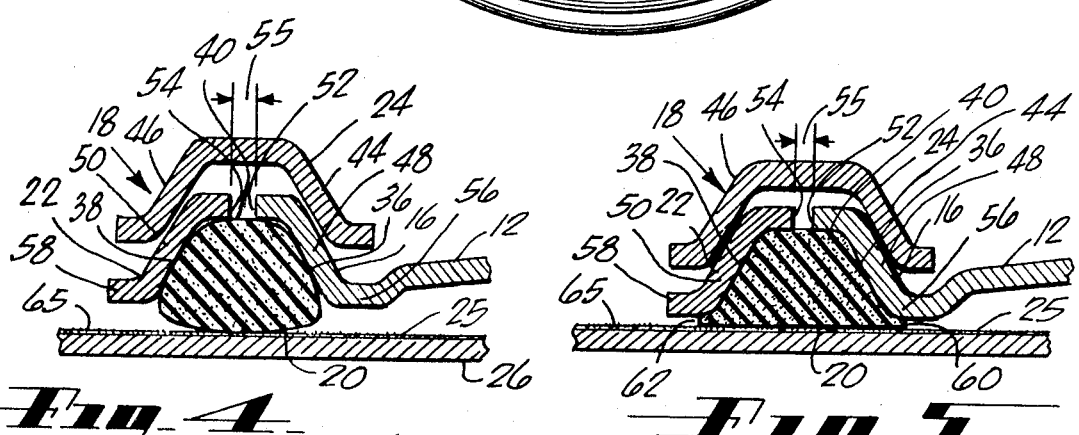
FIG. 4 is an enlarged cross-sectional view taken at line 4—4 of FIG. 2 with the clamping ring in a loose condition.
FIG. 5 is an enlarged cross-sectional view similar to FIG. 4 with the clamping ring in a normally tight condition.

The clamping ring 24 includes side portions 44 and 46 which have angles similar to the angles of the center portions 48 and 50 of the flared end portion 16 and the retaining ring 22 respectively. Therefore, as the clamping ring 24 is tightened about the hood 18, it causes the retaining ring 22 and the flared end portion 16 to move together as well as slightly inwardly toward the gasket 20. This is shown in FIG. 5. Since the retaining ring 22 and the flared end 16 of the bell-housing 12 both have similar generally S-curved cross-sections as aforesaid, their movement applies compressive force relatively equally against the side surfaces 36 and 38, and against substantial portions of the outer surface 40 of the gasket 20. This means that almost 100 percent of the gasket periphery is compressed so that less loading is required to assure a seal. This is desirable since lower gasket loading causes longer gasket life and easier slipping movement with respect to the tube 26 or the line. The uniform compressive action of the retaining ring 22 and the flared end 16 also assures that the gasket 20 is maintained in the desired position during tightening of the clamping ring 24.

The upper ends 52 and 54, of the flared end portion 16 and the retaining ring 22 respectively, are designed to face each other and to define a gap 55 therebetween. The gap 55 narrows as the force applied by the clamping ring 24 increases or as the gasket 20 wears. The gap 55 is therefore an indication of the condition of the gasket 20 and when the gap 55 narrows to such an extent that it no longer exists, it provides a visual clue that it is time to replace the gasket 20. The gap 55 can be observed in the area between the upstanding posts 28 and 30 without removing the clamping ring 24.

The lower portions 56 and 58, of the flared end portion 16 and the retaining ring 22 respectively, are curved so they are approximately parallel to the tube 26 and they have larger inner diameters than the outer diameter of the tube 26. The gasket 20 tends to deform into the space between the lower portions 56 and 58 and the tube 26 since it is otherwise substantially surrounded by the tube 26, the flared end portion 16 and the retaining ring 22. The deformation of the gasket 20 into the spaces maintains annulus gaps 60 and 62 separating the tube 26 from the retaining ring 22 and the flared end portion 16. The gaps 60 and 62 prevent contact between the rigid portions of the connector 10 and the line or optional insert tube 26. Therefore, the relatively economical and easily replaced gasket 20 is the only portion of the connector 10 that should wear out. The gasket 20 is replaced by loosening the clamping ring 24, sliding the retaining ring 22 away from the gasket 20, removing the gasket 20 and placing a new split gasket 20 under the hood 18 and replacing and repositioning the removed parts. This simple gasket replacement operation can be performed relatively quickly so that the equipment to which the connector 10 is attached need be out of commission for only a short time.

When the optional insert tube 26 is utilized in conjunction with the connector 10, the life of the gasket 20 is greatly increased. This is because the tube 26 may be constructed having a much smoother gasket abutting surface 25 than is possible from standard mill finished tubing. Also, the optional insert tube 26 can have dry lubricant 65 such as moly-disulfide applied on its surface 25 which also substantially increases the life of the gasket 20 when the connector 10 is installed in locations where relatively large axial or rotational movements are present.

Figure 6:
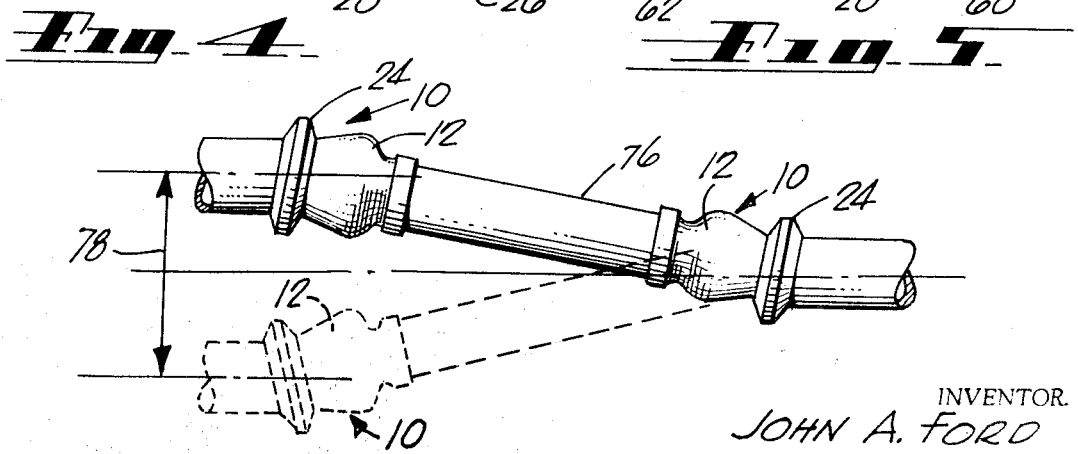
FIG. 6 shows two connectors constructed according to the present invention in use allowing lateral offset motion between two connected lines.

Referring again to FIG. 1, it can be seen that the tube 26 is constructed having a relatively long ring portion 66 parallel to the axis 68 of the connector 10. The ring portion 66 extends between two outwardly flared portions 70 and 72, and defines the amount of axial movement which can be absorbed by the connector 10. The outwardly flared portion 72 also prevents separation of the connector 10 from the tube 26 when axial deflections applied thereto are greater than allowable. The portion 72 provides a safety factor which enables the placement of connectors 10 in series along a line to take up deflections which are greater than could normally be absorbed by only one connector 10. An inwardly sloping wall portion 73 of the bell housing 12 forms a necked portion 74 preferably of slightly less inner diameter than the outer diameter of the line to be connected. When the optional insert tube 26 is not used, the sloping wall portion 73 engages the end of the line to prevent the connector assembly from creeping onto the line more than a predetermined amount. Connectors 10 arranged in series, such as shown in FIG. 6, can also be used with an intermediate spool piece 76 so that lateral offsets 78 between the connected lines or lateral vibrations therebetween can also be absorbed.

The angular movement which can be absorbed by the connector 10 is normally limited to about 12° at which point the flared portion 72 will abut the bell-housing 12. This angle can be increased or decreased as desired by controlling the amount of outward expansion of the center portion 80 of the bell-housing 12 and the size of the annulus gaps 60 and 62.

Thus there has been shown and described a novel flexible connector assembly which can accommodate simultaneous axial, angular and rotational motion and can be incorporated into all sorts of gas and fluid lines to simplify their installation. Examples include the installation of mufflers, spark arresters, and exhaust stacks in the case of gas lines, and pumps and coolers in the case of oil or water lines. The connectors, which can be easily constructed and maintained, fulfill all of the objects and advantages sought therefor. Many changes, modifications, variations, and other uses and applications of the subject invention will, however, become apparent to those skilled in the art after considering this specification together with the accompanying drawings. All such changes, modifications, variations and other uses and applications which do not depart from the spirit and scope of the invention are deemed to be covered by the invention which is limited only by the claims which follow.

What is claimed is:

1. A flexible connector for attaching first and second hollow lines and for allowing angular, axial and rotational movement therebetween, said connector including:

a bell-housing member adapted at one end thereof to mate with the first hollow line, having a second end of sufficient diameter to clear the second hollow line which is inserted therein by a predetermined distance, and an outwardly bulging central portion which provides clearance for angular deflections of the second hollow line with respect to said bell-housing member;

an annular retainer disposed around the second hollow line of sufficient diameter to clear the second hollow line and being juxtaposed said second end of said bell-housing member, said annular retainer and said second bell-housing member end including outwardly extending flanges inclined toward each other;

a ring shaped gasket having a generally isosceles trapezoidal cross-section disposed between said flanges, said outwardly extending flanges of said annular retainer and said second bell-housing member end including cylindrical end portions which extend toward each other, substantially enclosing the outer surface of said gasket and indicating the condition of the gasket by the gap defined therebetween; and an adjustable clamping ring substantially surrounding said flanges and having inwardly sloping side portions engageable with said flanges and facing end portions including means for forcing said end portions toward each other, whereby forcing said end portions toward each other tightens said ring and urges said flanges against said gasket and said gasket against the second hollow line to form a flexible seal, the tightening of said ring also forcing portions of said gasket into the clearance between the second hollow line and the annular retainer and the clearance between the second hollow line and the second bell-housing member end to prevent contact therebetween, said end portions of said clamping ring defining a gap therebetween whereby said gasket condition indication gap can be observed therethrough.

2. The connector defined in claim 1 wherein:
said gasket has cross-section edges with curvatures of radii larger than the inner diameter of said ring gasket and less than twice the inner diameter of said ring gasket.

3. The connector assembly defined in claim 1 wherein said cylindrical portion of said tubular member includes:
lubricant means thereon.

4. The flexible connector defined in claim 1 wherein said bell-housing member includes a stop portion having an inner diameter less than the diameter of said second end of said bell-housing member minus said predetermined distance said second end of said bell-housing member clears the second hollow line, said stop portion being positioned between said one end and said central portion of said bell-housing member.

5. A flexible connector for attaching first and second hollow lines and for allowing angular, axial and rotational movement therebetween, said connector including:

a bell-housing member having first and second opposite end portions of sufficient diameter to clear the first and second hollow lines which are inserted therein by predetermined distances respectively, and a pair of outwardly bulging central portions which provide clearance for angular deflections of the hollow lines with respect to said bell-housing member, said end portions having outwardly sloping flanges connected to cylindrical portions at the outermost extremities thereof, said end flanges having predetermined innermost diameters, first and second annular retainers disposed respectively around the first and second hollow lines of sufficient diameters to clear the hollow lines and each being juxtaposed said ends of said bell-housing member, said annular retainers including outwardly extending flanges inclined toward said respective ends of said bell-housing member and connected cylindrical portions at the extremities thereof;

first and second ring shaped gaskets having generally isosceles trapezoidal cross-sections disposed between said flanges, said outwardly extending flanges of said annular retainers, said bell-housing member ends and said cylindrical end portions substantially enclosing the outer surfaces of said gaskets and indicating the condition of the gasket by the gap defined therebetween; and first and second adjustable clamping rings substantially surrounding said first and second gasket enclosing flanges and having inwardly sloping side portions engageable with said flanges and facing end portions including means for forcing said end portions toward each other, whereby forcing said end portions toward each other tightens said rings and urges said flanges against said gaskets and said gaskets against the first and second hollow lines to form flexible seals, the tightening of said rings also forcing portions of said gaskets into the clearances between the first and second hollow lines and the annular retainers and the clearances between the first and second hollow lines and the first and second bell-housing member ends to prevent contact therebetween, said end portions of said clamping rings defining gaps therebetween whereby said gasket condition indication gaps can be observed therethrough.

6. The connector assembly defined in claim 5 wherein:

said first and second ring gaskets each have a generally isosceles trapezoidal cross-section, the edges of the cross-section having curvatures of radii larger than the inner diameter of said respective ring gasket and less than twice the inner diameter of said respective ring gasket.

7. The connector defined in claim 5 wherein:

said bell-housing member includes a first inwardly sloping wall portion spaced from said first end and a second inwardly sloping wall portion spaced from said second end, said first and second inwardly sloping wall portion defining at least one area of cross-section having a diameter less than the diameter of the respective hollow lines, forming stops to abut the ends of the first and second hollow lines to restrict the distance said connector can creep along the hollow lines.

* * * * *